Dec. 30, 1947.  M. GORN  2,433,512
KNIFE SHARPENER
Filed Jan. 22, 1947  2 Sheets-Sheet 2
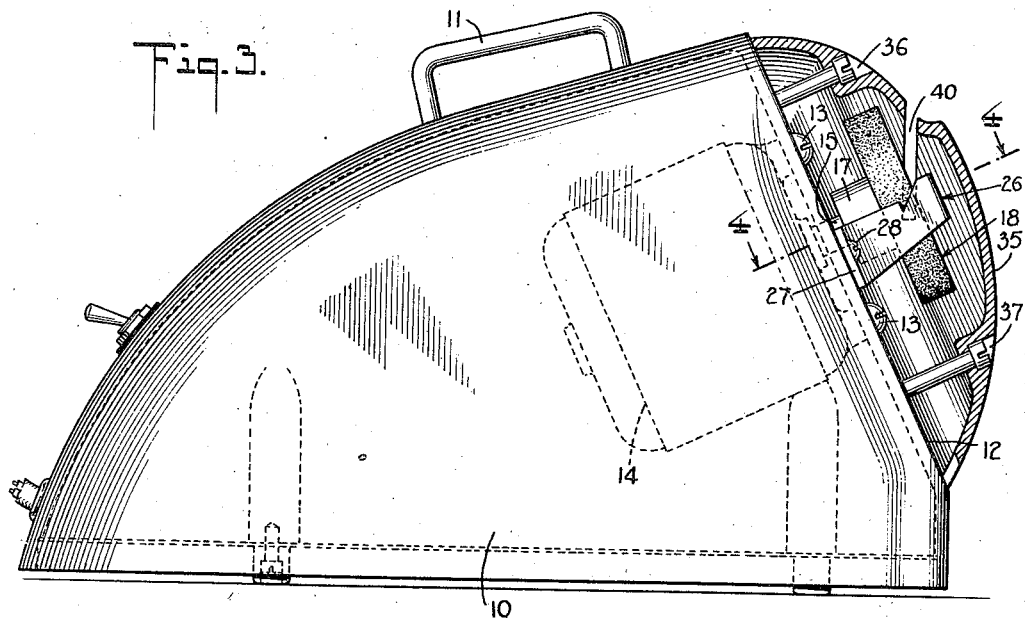
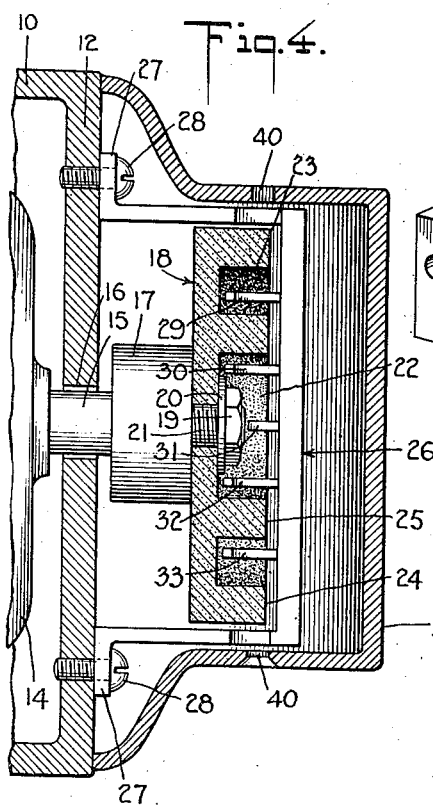
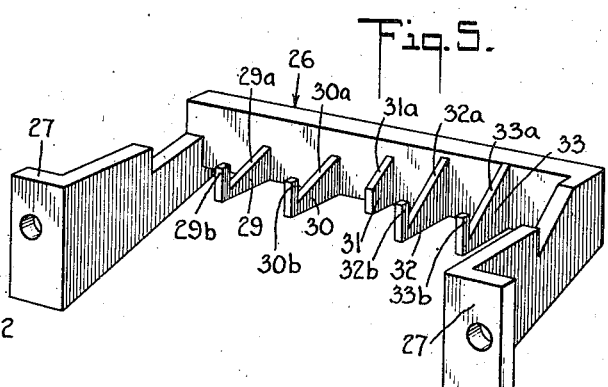
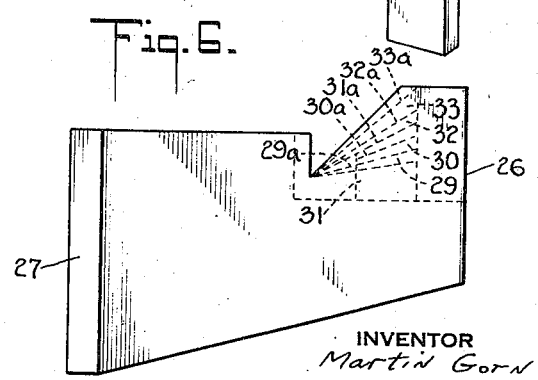
INVENTOR
*Martin Gorn*
BY *A. H. Golden*
ATTORNEY Patented Dec. 30, 1947

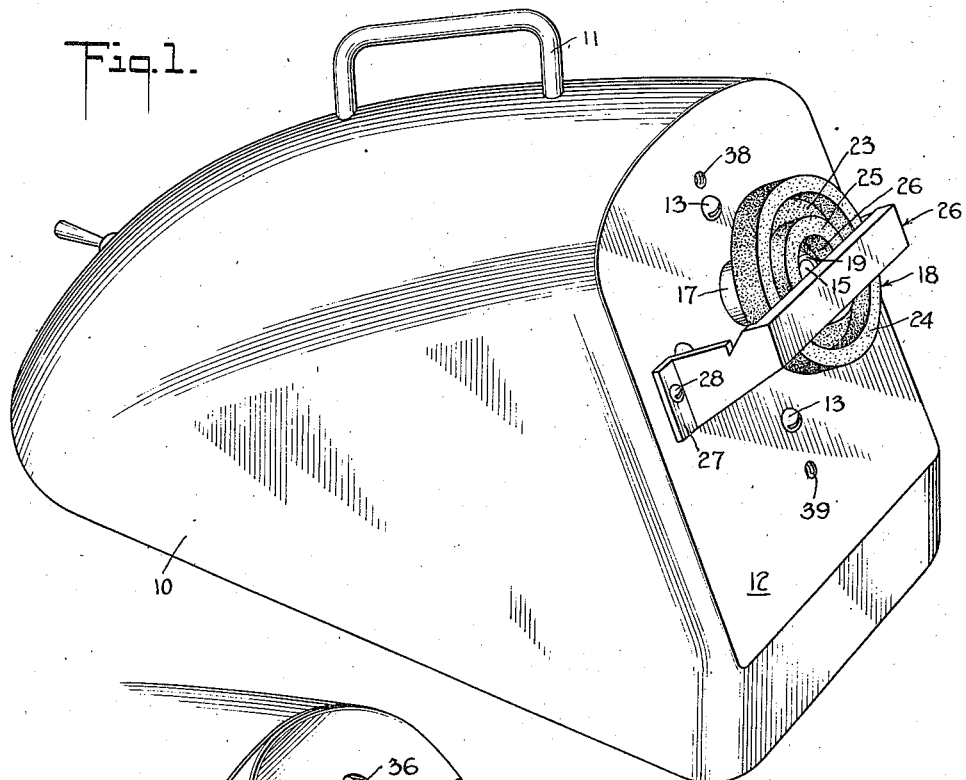
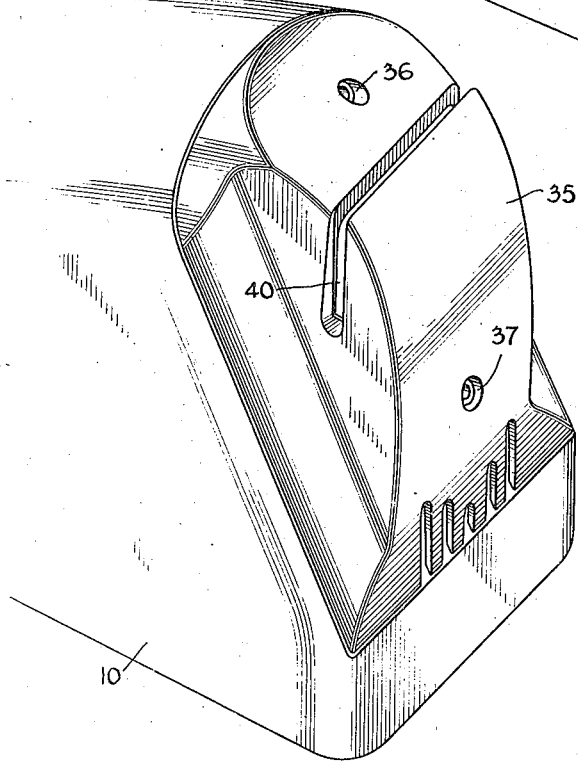

2,433,512

UNITED STATES PATENT OFFICE 2,433,512

KNIFE SHARPENER

Martin Gorn, Stamford, Conn.

Application January 22, 1947, Serial No. 723,561

3 Claims. (Cl. 51—128)

1

This invention relates to a knife sharpener, and more particularly to that type of a knife sharpener in which a rotating disc is adapted to sharpen the edge of a knife that is moved relatively to the face of the disc.

Knife sharpeners of the particular class indicated are quite well known in the art, and there are a considerable number of patents showing such knife sharpeners. In general, a grinding disc is mounted for rotation relatively to a casing, and a cover is provided for the casing, the casing having a slot for the insertion of a knife into contact with the rotating grinding wheel. While the slot in the casing cover is intended to guide the knife relatively to the grinding wheel, there are additional support means on the cover for supporting the knife in its movement relatively to the grinding wheel.

Knife sharpeners of the type indicated are limited for use with knives adapted for insertion through the slot in the casing cover, and moreover, the relationship of the knives to the grinding wheel is controlled by the said slot in the casing cover. This is due to the fact that there are no means independent of the cover for supporting a knife or other tool for sharpening by the rotating grinding wheel. Moreover, because the casing cover comprises the sole means for guiding a knife into grinding relation to the grinding wheel, and since the casing cover must be applied to the casing for the particular purpose, it is very difficult to adjust the knife support means of the casing cover relatively to the grinding wheel.

As a feature of my invention I provide a knife support adapted for cooperation with the casing cover in a combination of the class described. More in detail, my knife support is mounted independently of the casing cover, and may be used with or without the casing cover. Thus, the knife support has a dual function, since when used with the casing cover it cooperates with the slot of the casing cover for maintaining the knife in predetermined desired relation to the grinding wheel. On the other hand, with the casing cover removed, the knife support bracket will support any type of tool for grinding by the wheel.

As a further feature of the invention, the bracket may be changed in contour as by filing or the like, or a new bracket provided, in order to adapt the machine for additional uses, all without disturbing the basic guide function of the casing cover. It is further possible to provide brackets of different materials for use with different types of knives, all as will be understood by those skilled in the art, and this feature is a further important part of my invention.

I have thus outlined the general nature of my invention and its relation to the prior art in order that the description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as the basis for the designing of other structures for carrying out the several purposes of my invention. It is important, therefore, that the claims to be granted me shall be of sufficient breadth to prevent the appropriation of my invention by those skilled in the art.

Referring now to the drawings, Fig. 1 is a perspective view of a machine embodying my invention, the casing cover being removed therefrom. Fig. 2 is a view of the front end of the machine of Fig. 1, showing the casing cover applied thereto. Fig. 3 is a vertical section of the machine of Fig. 1. Fig. 4 is a section taken along lines 4—4 of Fig. 3. Fig. 5 is a perspective view of the knife support bracket while Fig. 6 is a side elevation thereof.

Referring now more particularly to the drawings, the casing in which my knife sharpener is installed is designated generally by reference numeral 10, and is preferably formed of cast iron or cast aluminum. A handle 11 is secured to the casing so that it may be carried from place to place, as those skilled in the art will appreciate. The front end wall of the casing 10 is designated by reference numeral 12, and has secured thereto as by screws 13, an electric motor 14. The main shaft of this motor is designated by reference numeral 15 as best seen in Fig. 4 and extends through a hole 16 in the forward end wall 12 of the casing perpendicularly to the plane of the said wall.

Secured to the shaft 15 is a boss 17 and fastened to the boss 17 is a grinding wheel or disc 18, held in place by a nut 19 and washer 20, the end of the shaft 15 being screw threaded at 21 for the particular purpose. The surface of the grinding wheel is grooved as at 23, and the grinding wheel has a central depression at 22, whereby to form in effect, two parallel circular grinding surfaces 24 and 25.

My knife support bracket is designated generally by reference numeral 26, and is substantially U-shaped, with the legs of the U terminating in flanges 27 that are applied to the forward surface of the end wall 12 and there secured by screws 28. It is obvious, of course, that any type of tool, or knife, or the like, may be supported on the knife support bracket 26 while in contact with the surfaces 24, 25 of the grinding wheel for sharpening thereby.

The knife support bracket is formed with a series of prongs 29, 30, 31, 32, and 33 integrally extending therefrom toward the grinding wheel. These prongs enter the groove 23 and the central depression 22 of the grinding wheel, as best illustrated in Fig. 4, and are so formed that when a knife is applied with its edge against the upper edge surfaces 29a, 30a, 31a, 32a, and 33a of the prongs, the said knife edge will lie simultaneously against the grinding surfaces 24, 25. In order to prevent the wedging of a knife between the grinding surfaces 24, 25 and the prongs 29 to 33 inclusive, the surfaces 29a, 30a, 31a, 32a, and 33a are formed to lie at different angles to the grinding wheel as best illustrated in Fig. 6. Moreover, in order to prevent the edge of the knife from wedging inwardly between the ends of the prongs 29 to 33 and the wheel 18, certain of the said prongs are equipped with upwardly extending lugs 29b, 30b, 32b, and 33b, it being obvious that these lugs will limit the movement of a knife to the left in Fig. 4.

For co-action with the knife support bracket 26 and the several prongs 29 to 33 inclusive, I provide a cover 35 for the front end of the machine, this cover being best illustrated in Fig. 2. Preferably, cover 35 is a casting and is provided with suitable bores 36 and 37 whereby it may be screwed to the forward end wall 12 of the casing, and for that purpose the said end wall has screw threaded bores 38 and 39 formed therein.

A guide slot 40 is formed in the cover 35, and this guide slot is in such relation to the knife support bracket 26 that when a knife is moved downwardly into the slot 40, its edge will be applied to the upper surfaces of the prongs 29 to 33 and in position to be moved relatively to the grinding wheel. This will probably be most apparent in Fig. 3, where, incidentally, it will be noted that the slot 40 is substantially vertical when cover 35 is assembled to the casing 10.

It will now be seen that when the cover 35 is applied in place as shown in Figs. 2 and 3, the said cover will cooperate with the knife support bracket 26 for the purposes described. It will further be seen that when the cover is removed, the knife support bracket 26 is still available for supporting a knife or a tool for grinding by the wheel 18. Further, it will be seen that the bracket 26 is available for change or manipulation, since it is preferably made of very soft metal that will lend itself to filing or the like, and therefore adjustment for different types of knives, as those skilled in the art will fully understand. Moreover, the bracket 26 may be observed in action with the cover 35 removed, and thereby more easily adjusted for the purposes set forth.

It will, thus, be seen that by a very simple arrangement of parts, I am able to obtain a contribution that has long been sought by the art and which makes more versatile and more useful and more effective the knife sharpeners of the particular class.

I now claim:

1. In a knife sharpener, a casing having a forward end wall inclining rearwardly and upwardly from its forward lower edge, an electric motor mounted in said casing at the rear of said wall and with its axis of rotation perpendicular to the plane of the wall, a main axial shaft for said motor extending through said wall in said axis and perpendicularly to said wall, a circular disc grinding wheel secured for rotation with said shaft in juxtaposed relation to said wall, said grinding wheel being grooved to form in effect a series of flat grinding surfaces lying in a plane parallel to the plane of said wall, a U-shaped knife support bracket having its central portion extending parallel to the grinding surfaces of said grinding wheel, the ends of said U-bracket extending toward said wall and having portions lying against said wall, means securing said bracket end portions to said wall, a series of prongs protruding from the central portion of the U-shaped knife support bracket and extending into the grooves of said grinding wheel, limit hooks on the ends of said prongs to prevent a knife moving off said prongs into said grooves, a cover for said grinding wheel and said knife support bracket, means removably securing said cover to said wall, and said cover having a slot therein positioned substantially vertically when said cover is secured to said wall whereby a knife may be moved into position with its edge resting on said prongs and against the grinding wheel.

2. In a knife sharpener, a casing having a forward end wall inclining rearwardly and upwardly from its forward lower edge, an electric motor mounted in said casing at the rear of said wall and with its axis of rotation perpendicular to the plane of the wall, a main axial shaft for said motor extending through said wall in said axis and perpendicularly to said wall, a circular disc grinding wheel secured for rotation with said shaft in juxtaposed relation to said wall, said grinding wheel being grooved to form in effect a series of flat grinding surfaces lying in a plane parallel to the plane of said wall, a U-shaped knife support bracket having its central portion extending parallel to the grinding surfaces of said grinding wheel, the ends of said U-bracket extending toward said wall and having portions lying against said wall, means securing said bracket end portions to said wall, a series of of prongs protruding from the central portion of the U-shaped knife support bracket and extending into the grooves of said grinding wheel, a cover for said grinding wheel and said knife support bracket, means securing said cover to said wall, and said cover having a slot therein positioned substantially vertically when said cover is secured to said wall whereby a knife may be moved into resting position on said prongs and with its edge against the grinding wheel.

3. In a knife sharpener, a casing having a forward wall, an electric motor mounted in said casing at the rear of said wall, a main axial shaft for said motor extending through said wall, a circular disc grinding wheel secured for rotation with said shaft in juxtaposed relation to said wall, said grinding wheel being grooved to form in effect a series of flat grinding surfaces, a U-shaped knife support bracket having its central portion extending parallel to the grinding surfaces of said grinding wheel, the ends of said U-bracket extending toward said wall and having portions lying against said wall, means securing said bracket ends to said forward wall, a series of prongs extending from the central portion of the U-shaped knife support bracket extending into the grooves of said grinding wheel, a cover for said grinding wheel and said knife support bracket, means removably securing said cover to said forward wall, and said cover having a slot therein positioned so that a knife may be moved into resting position on said prongs and with its edge against the grinding wheel.

MARTIN GORN.